United States Patent [19]
Courbot

[11] 3,915,263
[45] Oct. 28, 1975

[54] DISC BRAKE CALIPER AND SUPPORT STRUCTURE

[75] Inventor: Pierre Courbot, Villiers-le-Bel, France

[73] Assignee: Societe Anonyme D.B.A., Paris, France

[22] Filed: June 3, 1974

[21] Appl. No.: 475,351

[30] Foreign Application Priority Data
June 5, 1973 France ............................ 73.20321

[52] U.S. Cl. ............ 188/72.4; 188/73.3; 188/73.5; 188/73.6; 188/264 G
[51] Int. Cl.² ...................................... F16D 55/224
[58] Field of Search ....... 188/72.4, 73.3, 73.5, 73.1, 188/250 B, 73.6, 71.1, 72.5, 73.4, 264 G

[56] References Cited
UNITED STATES PATENTS

| | | | |
|---|---|---|---|
| 3,392,809 | 7/1968 | Hodkinson et al. | 188/72.4 |
| 3,416,634 | 12/1968 | Swift | 188/73.3 |
| 3,478,845 | 11/1969 | Kita | 188/73.3 |
| 3,500,966 | 3/1970 | Birge | 188/72.4 |
| 3,613,836 | 10/1971 | Dowell | 188/73.1 X |
| 3,783,980 | 1/1974 | Kallmeyer | 188/73.5 |

FOREIGN PATENTS OR APPLICATIONS

| | | | |
|---|---|---|---|
| 74,065 | 11/1960 | France | 188/72.4 |
| 321,634 | 6/1957 | Switzerland | 188/72.4 |
| 1,353,793 | 1/1964 | France | 188/73.6 |

Primary Examiner—George E. A. Halvosa
Attorney, Agent, or Firm—Ken C. Decker; William N. Antonis

[57] ABSTRACT

A disc brake comprising a fixed support, a rotary disc and a caliper straddling the disc to define a first and a second arm adjacent the respective faces of the disc, said caliper being axially movable relative to the fixed support to urge towards the disc a first pad by way of at least one brake actuator mounted in the first arm of the caliper, and a second pad by way of the second arm of the caliper. At least one of the pads is slidably anchored on two columns running parallel to the disc axis. The brake actuator includes a piston slidably mounted in a cylinder formed in the first arm of the caliper, the fixed support comprising a substantially flat plate which includes two side faces arranged parallel to the faces of the disc. The columns extend from one of the faces of the plate, its other face supporting at least one axial extension on which the caliper is slidable by way of its first arm, an aperture being provided in the plate to permit passage of an axial projection on the piston, said projection being designed to urge the first pad.

3 Claims, 6 Drawing Figures

DISC BRAKE CALIPER AND SUPPORT STRUCTURE

The object of the invention is a disc brake and a friction pad for such a disc brake.

More particularly, the invention relates to a disc brake comprising a fixed support, a rotary disc and a caliper straddling the disc to define a first and a second arm adjacent the respective faces of the disc, said caliper being axially movable relative to the fixed support to urge towards the disc a first pad by way of at least one brake actuator mounted in the first arm of the caliper, and a second pad by way of the second arm of the caliper, at least one of the pads being slidably anchored on two columns of the fixed support running parallel to the disc axis.

Disc brakes of this type have already been proposed. Generally the fixed support includes two arms, each arm supporting one of the columns which are situated beyond the periphery of the disc, the caliper being pivotably mounted on a pin provided on the support, substantially in the plane of the disc.

In disc brakes of the above type, the frictional engagement between the friction pads and the disc induces a heating of the brake which may be particularly dangerous when the brake actuators are hydraulically actuated. Effectively, the heating of the actuators may induces the boiling of the hydraulic braking fluid, thus producing a non-effectiveness of the braking.

For avoiding these drawbacks, the invention proposes a disc brake of the above type in which the actuator includes a piston slidably mounted in a cylinder formed in the first arm of the caliper, the fixed support comprising a substantially flat plate which includes two side faces arranged parallel to the faces of the disc, said columns extending from one of the faces of the plate, its other face supporting at least one axial extension on which the caliper is slidable by way of its first arm, an aperture being provided in the plate to permit passage of an axial projection on the piston, said projection being designed to urge said first pad. A brake embodying the invention is very easily manufactured and the brake forming the fixed support acts as a heat shield between the disc pads assembly and the brake actuator.

According to an embodiment of the invention, the caliper contains a central aperture into which the plate projects.

According to another embodiment of the invention, the caliper is slidable on a single axial extension comprising a cylindrical pin attached to the plate, the plate slidably cooperating with two edges of the aperture in the plate running parallel to the axis of the disc.

The invention also proposes a friction pad for such a brake, comprising a lining mounted on a substantially rectangular backing plate, a first slot being provided in one of the edges of the backing plate, two second slots symmetrical relative to a plane perpendicular to said one edge and passing by the friction center of the lining being provided in the opposite edge of the backing plate, whereas a recess is provided in said plane and in said opposite edge.

The invention will now be described in detail with reference to the accompanying drawings, in which.

Figure 1:
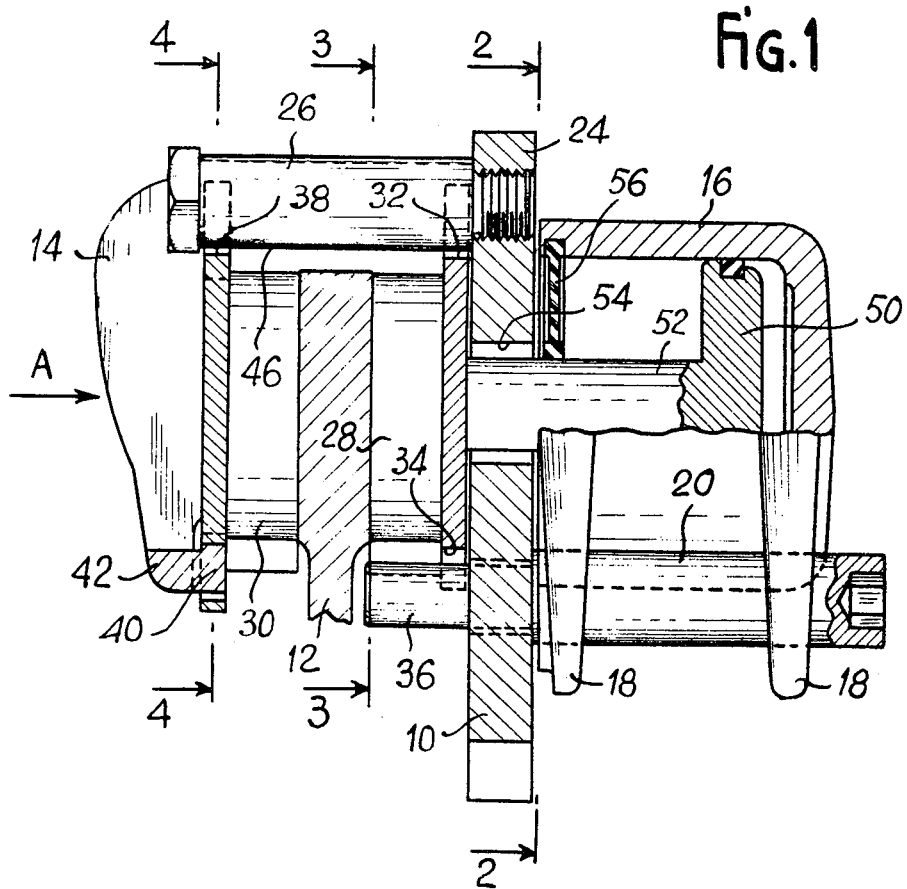
FIG. 1 is a side elevation of a brake embodying the invention, with a partial section along the axis of the brake actuator.
Figure 2:
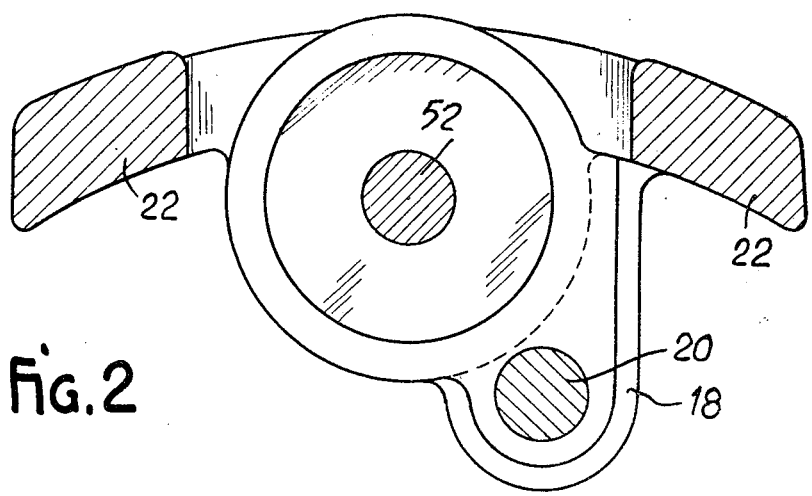
FIG. 2 represents a section through the brake along a line 2—2 in FIG. 1, that is to say, along a plane parallel to the plane of the disc.

As the drawings show, the disc brake embodying the invention has a fixed support comprising a substantially flat plate 10 capable of being fixed parallel to the plane of a disc 12 on a fixed portion of the kingpin support of the wheel which is to be braked. A sliding caliper straddles the disc 12 to define a first 16 and a second 14 arm adjacent the faces of the disc. The first arm 16 houses a brake actuator and is mounted by way of lobes 18 on an axial extension consisting of a cylindrical pin 20 attached to the plate 10.

The arms 14 and 16 of the caliper are connected by two arch or roof portions 22 defining a substantially rectangular aperture, through which the end 24 of the plate 10 projects. The width of the plate, measured circumferentially, is very slightly less than the distance between the edges of the aperture defined by the roof portions 22, on which the plate slides.

A column 26 is detachably mounted on the upper part 24 of the plate 10. The two pads of the disc brake, that is, the inner pad 28 and the outer pad 30, are slidable on and anchored on this column 26.

Figure 3:
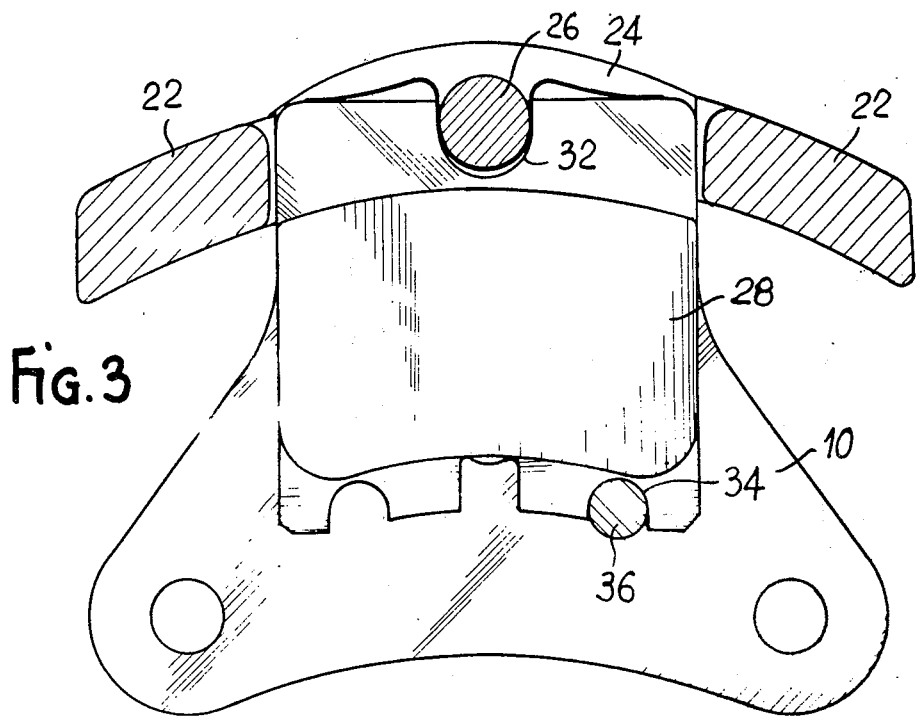
FIG. 3 shows a section along another plane parallel to the plane of the disc, on a line 3—3 in FIG. 1.

As FIG. 3 shows, the inner pad 28 has in its top a slot 32 capable of cooperating with the column 26. Its bottom, which is near the axis of the disc 12, contains a slot 34 cooperating with a smaller column 36 which forms an extension of the cylindrical pin 20, passing through the plate 10 and extending almost to the disc so that it can guide the pad 28 until its lining is fully worn.

Figure 4:
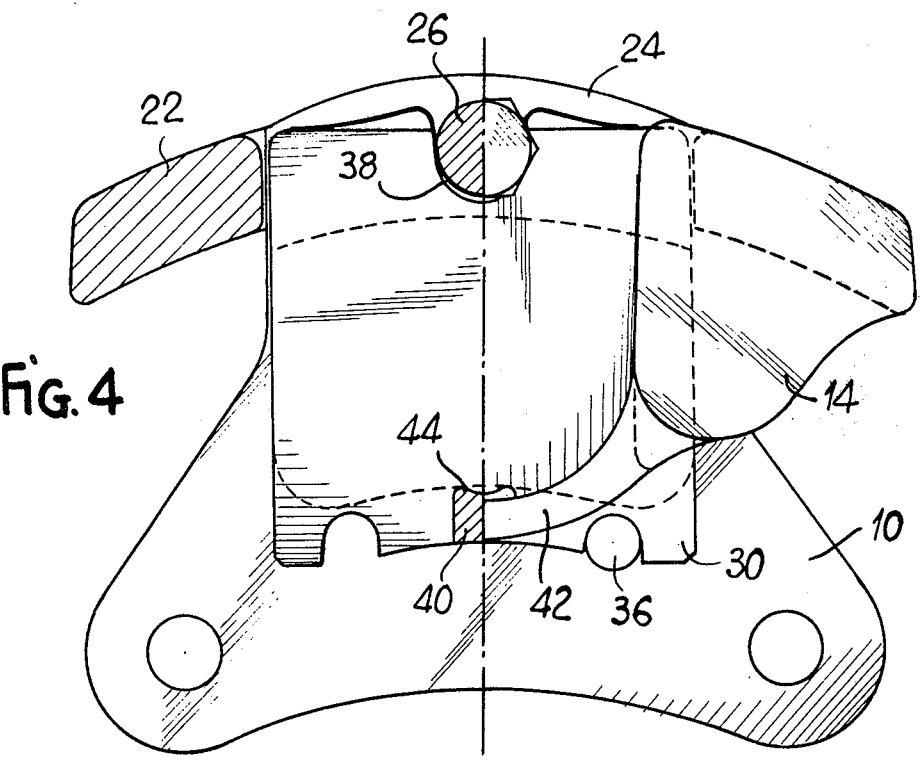
FIG. 4 represents, on the left, a half-section along a line 4—4 in FIG. 1, and on the right an end view as indicated by an arrow A in FIG. 1.

As shown in FIG. 4, the outer pad 30 contains at its top a slot 38, which has the same dimensions as the slot 32 in the pad 28 and engages the free end of the column 26. The pad 30 is held in place by a lug 40 belonging to a bridging portion 42 of the reaction element 14. As the drawing shows, the lug 40 enters a recess 44 in the centre of the bottom of pad 30.

Figure 5:
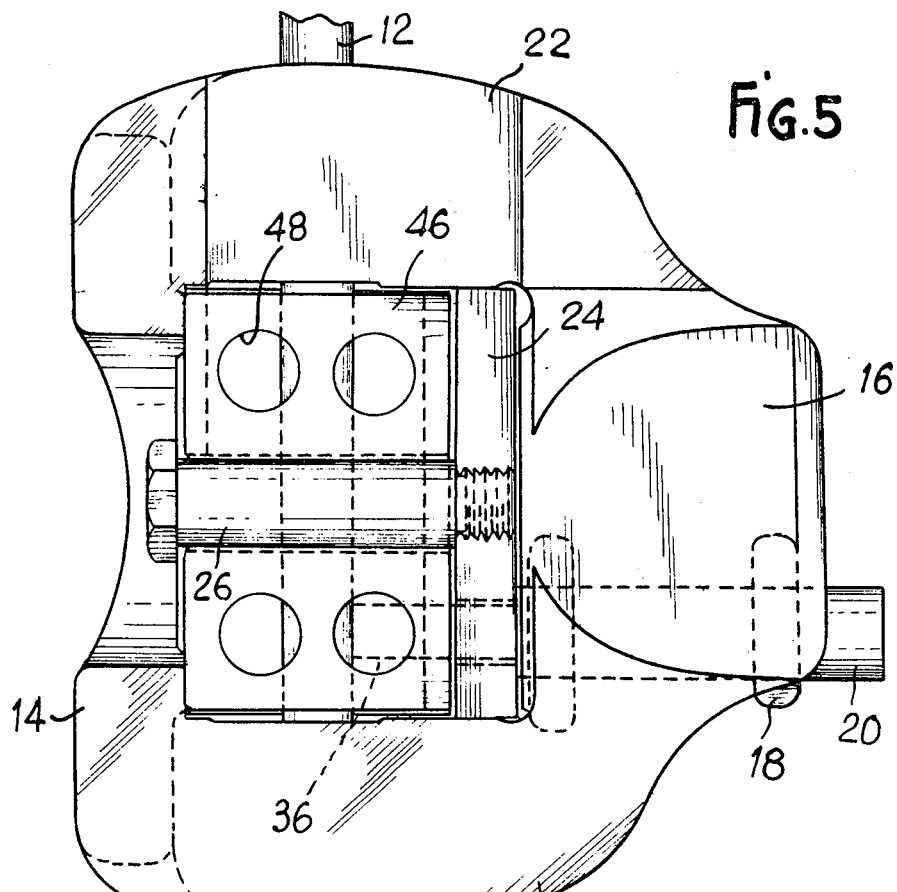
FIG. 5 is a plan view of the brake embodying the invention.

A noise-reducing spring 46 is inserted between the column 26 and the tops of the pads 28 and 30. It comprises a sheet of resilient metal, for example stainless steel, of which the part between the column 26 and slots 32, 38 is rolled, whereas its ends are bent back so that they bear down on the tops of the pads 28, 30, urging them radially inwards into the brake. As FIG. 5 shows, four circular holes 48 are provided to ventilate the brake and show how much the pads are worn.

The brake actuator in the caliper portion 16 will now be described. It comprises a piston 50 sliding in a bore in the caliper and connected by an axial projection 52 to the pad 28. The projection 52 passes through the plate 10 by way of an aperture 54 in the plate. Between the projection 52 and the edges of the bore for the piston 50, a sealing ring 56 prevents dirt from entering the bore.

The brake just described operates as follows:

When brake pressure fluid is introduced between the piston 50 and the end of its bore, the projection 52 urges the pad 28 on to the adjoining side of the disc, and the reaction element 14 returns the pad 30 in the opposite direction, on to the other side of the disc.

The component of the braking torque applied to the pad 28 is transmitted in substantially equal parts of the column 26 and the smaller column 36, whereas the component of the braking torque applied to the pad 30 is transmitted partly to the column 26 and partly to the reaction element 14 of the caliper by way of the lug 40.

To replace worn pads, the column 26 is unscrewed with a spanner applied to its head, which is hexagonal. The pads are withdrawn radially outwards through the gap between the roof portions 22. As the drawing shows, the pads are in fact slightly narrower than this gap; the lateral edges of the pads are not intended to touch the roof portions 22 of the caliper during braking.

This application relates also to the pads used in the disc brake just described.

Figure 6:
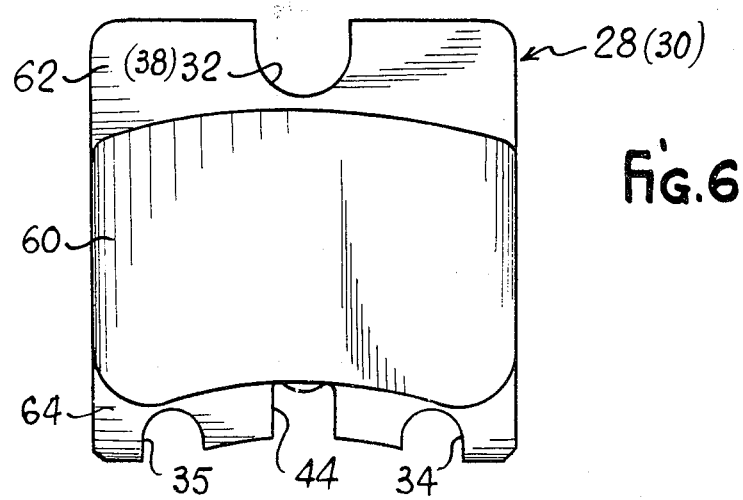
FIG. 6 is a general view of a pad used in the brake of FIGS. 1 to 5.

A pad will now be described in more detail with reference to FIG. 6.

The pad shown in this Figure can be used as either an inner pad 28 or an outer pad 30. It comprises a substantially rectangular lining 60 mounted on a lining backing plate which is nearly square. The top 62 and bottom 64 of this backing plate project beyond the lining 60.

The center of the top 62 of the backing plate contains a slot 32 (38) capable of cooperating with the column 26 for anchoring purposes, as described above.

The centre of the bottom 64 of the backing plate contains a recess 44 to cooperate with the lug 40 on the bridging portion 42 of the caliper arm 14, and also a slot 34 to anchor the pad on the smaller column 36. Another slot 35, symmetrical relative to the plane of symmetry of the pad 28 (30) can cooperate with the smaller column 36 in the brake belonging to that vehicle wheel which is symmetrical relative to the wheel carrying the brake illustrated in the drawings.

Brakes as described in this application may, of course, be equipped with pairs of pads of which each pair includes one pad with a recess 44 and one pad with a slot 34 and/or 35, all pads having the upper slot 32 (38).

I claim:

1. In a disc brake, a rotor having a pair of opposed faces, a fixed support mounted adjacent said rotor, a caliper slidably mounted on said fixed support and straddling said rotor, said caliper having a pair of arms adjacent corresponding friction faces of the rotor, a pair of friction pads adjacent corresponding friction faces and associated with a corresponding one of said arms, one of said arms defining a pressure cylinder therewithin, a piston slidably mounted in said cylinder, said piston including an axially extending projection extending from one face of said piston, the cross-sectional area of said projection being less than the area of said one face, said fixed support comprising a plate disposed between said piston and the friction pad associated with said one arm, said plate defining an aperture having an area less than the areas of said one face whereby the fixed support acts as a heat shield between the piston and the friction pads, said projection extending through said aperture to engage said friction pad associated with said one arm to urge the latter into engagement with the corresponding face of the rotor when a brake application is effected, said caliper defining an opening having a pair of circumferentially spaced edges, said fixed support extending through said opening, said caliper anchoring against said fixed support by engagement of a corresponding one of said circumferentially spaced edges of said opening with a corresponding side of said fixed support; an axially extending extension projecting from said fixed support, said caliper being slidably mounted on said extension, a pair of axially extending columns projecting from said fixed support in a generally axial direction with respect to said rotor, one of said columns extending over the periphery of the rotor, one of said friction pads being supported by said columns, said other column extending from said extension and projecting from the side of the fixed support facing said rotor and located radially inwardly from the periphery of the rotor, said one friction pad having a pair of slots, each of said slots engaging a corresponding column to retain said one friction pad to the caliper, and a lug projecting from the other arm of the said caliper, the other friction pad having a pair of slots, one of said slots engaging said lug, the other slot engaging the column extending across the periphery of the rotor.

2. The invention of 1; and
a noise reducing spring comprising a resilient metal sheet carried by said one column and yieldably urging said friction pads toward the axis of said disc.

3. The invention of claim 1:
said one column being dismountable; said friction pads being removable through said opening upon dismounting of said one column.

* * * * *